United States Patent
Wu

(10) Patent No.: US 10,038,487 B2
(45) Date of Patent: Jul. 31, 2018

(54) CSI FEEDBACK METHOD AND APPARATUS IN LARGE SCALE ANTENNA SYSTEM

(71) Applicant: Alcatel Lucent, Boulogne Billancourt (FR)

(72) Inventor: Keying Wu, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 86 days.

(21) Appl. No.: 14/892,320

(22) PCT Filed: May 29, 2013

(86) PCT No.: PCT/CN2013/000633
§ 371 (c)(1),
(2) Date: Nov. 19, 2015

(87) PCT Pub. No.: WO2014/190452
PCT Pub. Date: Dec. 4, 2014

(65) Prior Publication Data
US 2016/0112108 A1    Apr. 21, 2016

(51) Int. Cl.
*H04L 12/26* (2006.01)
*H04B 7/06* (2006.01)
(Continued)

(52) U.S. Cl.
CPC ......... *H04B 7/0626* (2013.01); *H04B 7/0417* (2013.01); *H04W 24/08* (2013.01)

(58) Field of Classification Search
CPC .... H04W 24/00; H04L 43/50; H04L 43/0852; H04L 43/08; H04B 17/003
See application file for complete search history.

(56) References Cited

U.S. PATENT DOCUMENTS 6,795,392 B1 *   9/2004   Li ........................... H04L 5/023
                                                                342/373
8,249,204 B2     8/2012   Wu et al.
(Continued)

FOREIGN PATENT DOCUMENTS

CN      101626588 A      1/2010
CN      102457321 A      5/2012
(Continued)

OTHER PUBLICATIONS

Sakaguchi et al., "Measurement, Analysis, and Modeling of MIMO Propagation Channel", The IEICE Transactions B, Communication J88-B(9), Sep. 1, 2005, pp. 1624-1640.
(Continued)

*Primary Examiner* — Siren Wei
(74) *Attorney, Agent, or Firm* — Fay Sharpe, LLP

(57) ABSTRACT

The present invention relates to a channel state information (CSI) feedback method and apparatus in a large-quantity antenna system. An embodiment provides a method used in a UE of a large scale antenna system, including: detecting a downlink channel; determining, according to a multipath propagation model, a channel response of a first number of strong propagation paths, where the channel response of each propagation path is determined as a matrix related to the following time-varying parameters: an arrival direction, time to arrive, and a path amplitude; and feeding back the first number and indication information of the time-varying parameters of the first number of strong propagation paths. By using the sparsity of channels of the large-quantity antenna system, the present invention reduces a feedback payload and maintains at least equal system performance.

7 Claims, 2 Drawing Sheets

(51) Int. Cl.
*H04W 24/08* (2009.01)
*H04B 7/0417* (2017.01)

(56) References Cited

U.S. PATENT DOCUMENTS

| | | | | |
|---|---|---|---|---|
| 2010/0008431 A1* | 1/2010 | Wu | ............... | H04W 8/24 |
| | | | | 375/244 |
| 2013/0201912 A1* | 8/2013 | Sheng | ............... | H04B 7/0413 |
| | | | | 370/328 |

FOREIGN PATENT DOCUMENTS

| | | | |
|---|---|---|---|
| JP | 2003-60558 A | 2/2003 |
| JP | 2010-93497 A | 4/2010 |
| JP | 2010-232976 A | 10/2010 |
| JP | 2011-14980 A | 1/2011 |
| JP | 2011-526108 A | 9/2011 |
| WO | 2006/106693 A1 | 10/2006 |
| WO | WO 2011/146606 A1 | 11/2011 |
| WO | 2012/020309 A2 | 2/2012 |

OTHER PUBLICATIONS

Shintaro Arata, "A Radio Propagation Measurement Technique for the Next Generation Wireless System: MIMO Channel Sounder", Proceedings of the IEICE Conference 2010 Communication (1), pp. "SS-98"-"SS-99", Aug. 31, 2010.
International Search Report for PCT/CN2013/000633 dated Mar. 6, 2014.

\* cited by examiner

CSI FEEDBACK METHOD AND APPARATUS IN LARGE SCALE ANTENNA SYSTEM

BACKGROUND OF THE INVENTION

Field of the Invention

The present invention generally relates to a mobile communications technology, and more particularly, to a multiple user multiple input multiple output (MU MIMO) transmission technology.

Description of the Prior Art

In a Frequency Division Duplexing (FDD) system, downlink closed loop MIMO processing requires channel state information (CSI) feedback from a user equipment (UE). With the increase of the number of base station antennas, the feedback payload also increases, which makes it more and more difficult for the CSI feedback payload to meet the requirement of an actual application. In a large scale antenna system, a base station device may be equipped with and use 100 or more antennas. In this case, the conventional short-time CSI feedback is impractical for the actual application. In another aspect, the decrease of the total transmit power of the large scale antenna system mostly relies on precise CSI, which also makes the CSI feedback essential in the large scale antenna system.

SUMMARY OF THE INVENTION

A main object of the present invention is to provide a CSI feedback solution used in a MIMO system, to solve the defects in the prior art. Recent multi-antenna measurement and researches indicate that in most cases, a radio cannel in a large scale antenna system is sparse, and the channel capacity of the radio channel is merely determined by some free degree (which is far less than the number of antennas).

An embodiment provides a method used in a UE of a large scale antenna system, including: detecting a downlink channel; determining, according to a multipath propagation model, a channel response of a first number of strong propagation paths, where the channel response of each propagation path is determined as a matrix related to the following time-varying parameters: an arrival direction, time to arrive, and a path amplitude; and feeding back the first number and indication information of the time-varying parameters of the first number of strong propagation paths.

In an embodiment of the foregoing method, indication information of the arrival direction and time to arrival is fed back based on a first average period, indication information of the path amplitude is fed back based on a second average period, and the first average period is longer than the second average period.

In an embodiment of the foregoing method, the downlink channel includes a sub-band, where the indication information of the time-varying parameters of the first number of strong propagation paths includes: indication information of the arrival direction, and indication information of a joint mean value of the time to arrive and the path amplitude in the sub-band.

In an embodiment of the foregoing method, the indication information of the arrival direction is fed back based on a first average period, the indication information of the joint mean value of the time to arrive and path amplitude in the sub-band is fed back based on a second average period, and the first average period is longer than the second average period.

Another embodiment provides a method used in a base station device of a large scale antenna system, including: receiving a first number and indication information of time-varying parameters of the first number of strong propagation paths, where the first number and the indication information are fed back by a UE, and the time-varying parameters include: an arrival direction, time to arrive, and a path amplitude; and determining a downlink channel response according to the received indication information of the time-varying parameters of the first number of strong propagation paths.

In an embodiment of the foregoing method, the downlink channel includes a sub-band, where the indication information of the time-varying parameters of the first number of strong propagation paths includes: indication information of the arrival direction, and indication information of a joint mean value of the time to arrive and the path amplitude in the sub-band.

A still another embodiment provides an apparatus used in a UE of a large scale antenna system, including: a detection module, configured to detect a downlink channel; a calculation module, configured to determine, according to a multipath propagation model, a channel response of a first number of strong propagation paths, where the channel response of each propagation path is determined as a matrix related to the following time-varying parameters: an arrival direction, time to arrive, and a path amplitude; and a feedback module, configured to feed back the first number and indication information of the time-varying parameters of the first number of strong propagation paths.

In an embodiment of the foregoing apparatus, the feedback module is configured to feed back indication information of the arrival direction and time to arrival based on a first average period, and feed back indication information of the path amplitude based on a second average period, where the first average period is longer than the second average period.

In an embodiment of the foregoing apparatus, the downlink channel includes a sub-band, where the indication information of the time-varying parameters of the first number of strong propagation paths includes: indication information of the arrival direction, and indication information of a joint mean value of the time to arrive and the path amplitude in the sub-band.

In an embodiment of the foregoing apparatus, the feedback module is configured to feed back the indication information of the arrival direction based on a first average period, and feed back the indication information of the joint mean value of the time to arrive and the path amplitude in the sub-band based on a second average period, where the first average period is longer than the second average period.

A UE includes the foregoing apparatus.

Another embodiment provides an apparatus used in a base station device of a large scale antenna system, including: a receiving module, configured to receive a first number and indication information of time-varying parameters of the first number of strong propagation paths, where the first number and the indication information are fed back by a UE, and the time-varying parameters include: an arrival direction, time to arrive, and a path amplitude; and a calculation module, configured to determine a downlink channel response according to the received indication information of the time-varying parameters of the first number of strong propagation paths.

In an embodiment of the foregoing apparatus, the downlink channel includes a sub-band, where the indication information of the time-varying parameters of the first number of strong propagation paths includes: indication information of the arrival direction, and indication information of a joint mean value of the time to arrive and the path amplitude in the sub-band.

A base station device includes the foregoing apparatus.

The technical features and advantages of the present invention are described above so that the detailed description of the present invention below is easier to understand. Other features and advantages of the present invention will be described in the following, to form the subject of the claims of the present invention. A person skilled in the art can understand that the disclosed concepts and embodiments can be easily modified, or a basis of a structure or procedure used for implementing the same objective as the present invention can be designed. A person skilled in the art should also understand that, such equivalent structures still fall within the spirit and scope of the appended claims.

BRIEF DESCRIPTION OF THE DRAWINGS

With reference to the accompanying drawings, the detailed description of the preferred embodiments of the present invention is easier to understand. The present invention is described by using examples, but is not limited to the accompanying drawings; similar sings in the accompanying drawings refer to similar elements.

DETAILED DESCRIPTION

The detailed description of the accompanying drawings is intended to serve as the description of the current preferred embodiment of the present invention, but is not intended to represent the only form for implementing the present invention. It should be understood that identical or equivalent functions can be implemented by different embodiments included in the spirit and scope of the present invention.

A person skilled in the art can understand that, the means and functions described herein can be implemented by software functions that combine a program control microprocessor and a general computer and/or implemented by using an application specific integrated circuit (ASIC). It should be further understood that, although the present invention is described in the form of methods and apparatuses, the present invention can also be embodied as a computer program product and a system that includes a computer processor and a memory connected to the processor. The memory is encoded by using one or more programs that can implement the functions disclosed herein.

A person skilled in the art should understand that, the base station or base station device herein is, for example, a Node B or an evolved Node N (eNB) in an LTE system or an LTB-A system, but is not limited thereto. The technical solution of the present invention is not limited to applications in the LIE system or the LTE-A system.

A base station is configured with a linear antenna array of N transmit antennas, and uses an Orthogonal Frequency Division Multiplexing (OFDM) system with the number of subcarriers being $N_{FFT}$. A radio multipath channel is formed by K propagation paths, and for each propagation path, time to arrive (ToA) is $\tau_k$, an arrival direction is $\theta_k$, and a complex amplitude is $\beta_k$ (k=1 to K). A frequency domain of the channel response thus can be represented as follows:

$$H = [h_1, \Lambda, h_{N_{FFT}}] = \sum_{k=1}^{k} a(\theta_k)\beta_k f^H(\tau_k), \quad (1)$$

where H is an $N \times N_{FFT}$ dimension matrix, the $(n,j)^{th}$ element represents an attenuation coefficient of the $n^{th}$ transmit antenna on the $j^{th}$ subcarrier, and $h_j = [h(1, j)\Lambda h(N, j)]^T$ is the $j^{th}$ column of H. In formula (1), $$a(\theta_k) = [1, \exp(l2\pi\theta_k), \Lambda, \exp(l(N-1)2\pi\theta_k)]^T \quad (2),$$

and $$f(\tau_k) = [1, \exp(l2\pi W\tau_k/N_{FFT}), \Lambda, \exp(l2\pi(N_{FFT}-1)W\tau_k/N_{FFT})]^T \quad (3),$$

where $\tau = \sqrt{-1}$, W represents the system bandwidth, $\theta_K = d \sin(\varphi_k)/\lambda = \alpha \sin(\varphi_k)$, $\varphi_k$ represents a physical arrival angle of the $k^{th}$ path, d represents a distance between antennas, $\lambda$ represents the subcarrier wavelength for transmission, and $\alpha = d/\lambda$. Due the sparsity of the radio channel of the large scale antenna system, only a limited number of domain propagation paths or strong propagation paths make contribution to the communication capacity.

Figure 1:
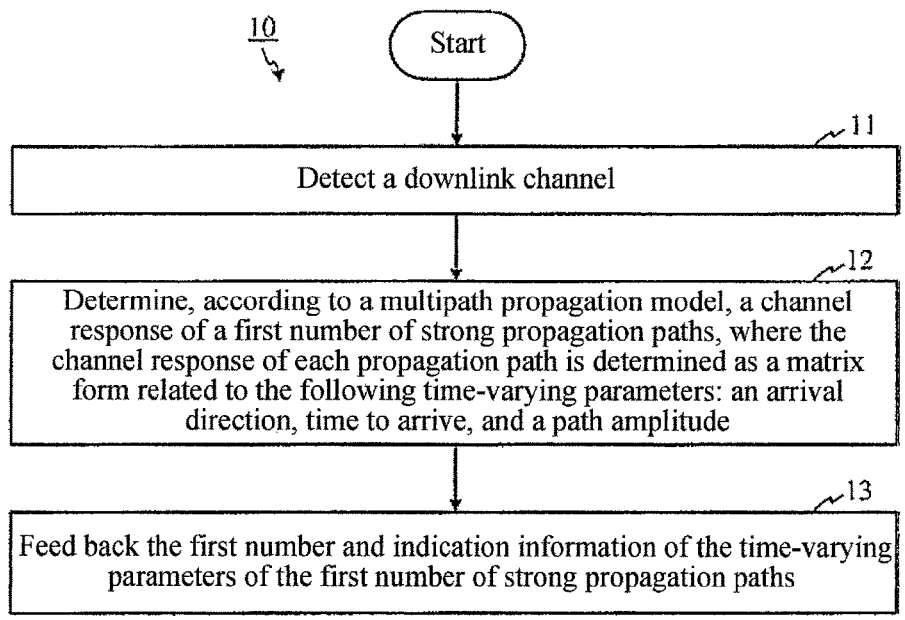
FIG. 1 shows a flowchart of a method used in a UE of a large scale antenna system according to an embodiment of the present invention.
Figure 2:
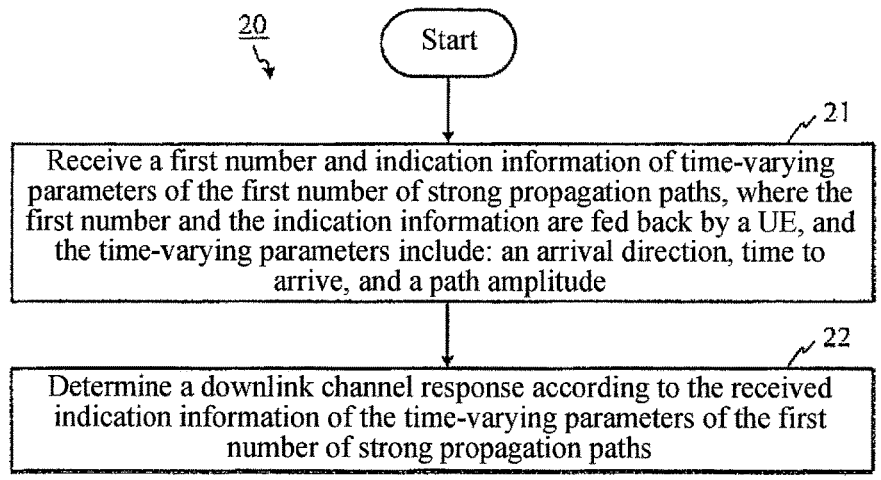
FIG. 2 shows a flowchart of a method used in a base station device of a large scale antenna system according to an embodiment of the present invention.

FIG. 1 shows a flowchart of a method 10 used in a UE of a large scale antenna system according to an embodiment of the present invention. FIG. 2 shows a flowchart of a method 20 used in a base station device in a large scale antenna system according to an embodiment of the present invention. As shown in the figures, the method 10 includes Steps 11, 12, and 13, and the method 20 includes Steps 21 and 22.

In Step 11, a UE detects a downlink channel

In Step 12, the UE determines, according to a multipath propagation model from the detected downlink channel (matrix), a channel response of a first number of strong propagation paths, where the channel response of each propagation path is determined as a matrix related to the following time-varying parameters: an arrival direction, time to arrive, and a path amplitude. The channel response of each propagation path is, for example, the expression form at the right side of the equation in formula (1), but is not limited thereto.

A first number of strong propagation paths are usually selected by using the following manners.

In the first manner, the "first number" is not predetermined. First, a propagation path with a maximum amplitude, that is, a propagation path whose corresponding $\beta_k$ has a maximum module, is determined. Then, all propagation paths, ratios of amplitudes of which to the maximum propagation path amplitude are not less than (or greater than) a predetermined value, are determined, where the predetermined value is, for example, any value between 0.1 and 0.2, but is not limited thereto. The propagation paths, the ratios of the amplitudes of which to the maximum propagation path amplitude are not less than the predetermined value (including the propagation path with the maximum amplitude value), are the first number of strong propagation paths. In an extreme case, the "first number" may be 1, that is, there is only one strong propagation path, namely, the propagation path with the maximum amplitude value.

In the second manner, the "first number" is determined in advance. The "first number" of propagation paths with the maximum amplitude are strong propagation paths. This manner can control the operation volume and the feedback information volume in advance.

In Step 13, the UE feeds back the first number and indication information of the time-varying parameters of the first number of strong propagation paths.

Generally, the "first number" (the number of strong propagation paths) is represented as $K_d$, and all the propagation paths are sequenced in descending order of amplitudes, that is, $|\beta_1| \geq |\beta_2| \geq \Lambda \geq |\beta_k|$. The UE feeds back the indication information of the time-varying parameters of $K_d$ strong propagation paths. The number $K_d$ of the strong propagation paths is less than the total number K of propagation paths of the multipath channel, and therefore the feedback payload can be reduced.

In an embodiment, the UE feeds back $\{\tau_k, \theta_k, \beta_k | k=1 \sim K_d\}$. The change of the path amplitude with time is faster than the change of the arrival direction and time to arrive with time, and therefore, the UE feeds back $\{\tau_k, \theta_k | k=1 \sim K_d\}$ in a first average period which is longer, and feeds back $\{\beta_k | k=1 \sim K_d\}$ in a second average period which is shorter. In this way, feedback modes of different periods are applicable to the time-varying feature of the channel parameters, thereby further saving the feedback payload.

In another embodiment, the UE feeds back $\{\theta_k | k=1 \sim K_d\}$ in the first average period which is longer, and feeds back $\{\tau_k, \beta_k | k=1 \sim K_d\}$ in the second average period which is shorter. In still another embodiment, the UE feeds back $\{\theta_k | k=1 \sim K_d\}$, $\{\tau_k | k=1 \sim K_d\}$, and $\{\beta_k | k=1 \sim K_d\}$ in three different average periods.

In Step 21, the base station device receives the first number and the indication information of the time-varying parameters of the first number of strong propagation paths, where the first number and the indication information are fed back by the UE, and the time-varying parameters include: an arrival direction, time to arrive, and a path amplitude. For example, the arrival direction, time to arrive, and path amplitude are $\{\theta_k | k=1 \sim K_d\}$, $\{\tau_k | k=1 \sim K_d\}$, and $\{\beta_k | k=1 \sim K_d\}$ that are fed back by the UE, but are not limited thereto.

In Step 22, the base station device determines a downlink channel response according to the received indication information of the time-varying parameters of the first number of strong propagation paths. The reconstruction of the downlink channel may be represented by the following formula (4), but is not limited thereto.

$$\hat{H} = \sum_{k=1}^{K_d} a(\theta_k) \beta_k f^H(\tau_k). \tag{4}$$

In some cases, several or only one sub-band is allocated to the UE. The channel response on one sub-band may be regarded as flat; only the channel coefficient allocated to the UE needs to be fed back and reported, and it is unnecessary to report channel coefficients of the entire bandwidth. The foregoing formula (1) can be re-written as:

$$H = \sum_{k=1}^{K} a(\theta_k) \beta_k f^H(\tau_k) = \sum_{k=1}^{K} a(\theta_k) \beta_k^\rho, \tag{5}$$

where $\overset{\rho}{B}_k = \{b_{k,j}\} \equiv \beta_k f^H(\tau_k)$ is a $1 \times N_{FFT}$ two-dimensional vector. A channel vector of the $j^{th}$ subcarrier can be represented as $$h_j = \sum_{k=1}^{K} a(\theta_k) b_{k,j} \tag{6}$$

The whole bandwidth is divided into multiple sub-bands, and the channel response in each sub-band can be regarded as flat. An average channel vector of the $s^{th}$ sub-band is represented as $\tilde{h}_s$, and $\tilde{h}_s$ is calculated according to the following formula:

$$\tilde{h}_s = \frac{1}{J_S} \sum_{k=1}^{K} a(\theta_k) \sum_{j \in J(s)} b_{k,j} = \sum_{k=1}^{K} a(\theta_k) \tilde{b}_{k,s}, \tag{7}$$

$J_S$ represents the number of subcarriers in one sub-band, $J(s)$ represents a set of subcarriers in the $s^{th}$ sub-band, and $$\tilde{b}_{k,s} = \frac{1}{J_S} \sum_{j \in J(s)} b_{k,j}$$

represents a joint mean value of the time to arrive and path amplitude in the sub-band. If only the $s^{th}$ sub-band is allocated to the UE, the UE only feeds back and reports $\tilde{h}_s$ to the base station device, and it is unnecessary to report the complete channel matrix H.

Similarly, a first number of strong propagation paths are determined as $K_d$ propagation paths with a maximum module of the joint mean value $\tilde{b}_{k,s}$ or a maximum norm. Generally, all propagation paths are sequenced in descending order of modules of the joint mean values of time to arrive and path amplitudes, that is, $|\tilde{b}_{1,s}| \geq |\tilde{b}_{2,s}| \geq \Lambda \geq |\tilde{b}_{k,s}|$, and the UE only needs to feed back indication information of the time-varying parameters of $K_d$ strong propagation paths. The number $K_d$ of the strong propagation paths is less than the total number K of propagation paths of the multipath channel, and therefore the feedback payload can be reduced.

In an embodiment, the UE feeds back $\{\theta_k, \tilde{b}_{k,s} \leq k=1 \sim K_d\}$. The change of the joint mean value of the path amplitude with time is faster than the change of the arrival direction with time, and therefore, the UE feeds back $\{\theta_k \leq k=1 \sim K_d\}$ in a first average period which is longer, and feeds back $\{\tilde{b}_{k,s} | k=1 \sim K_d\}$ in a second average period which is shorter. In this way, feedback modes of different periods are applicable to the time-varying feature of the channel parameters, thereby further saving the feedback payload.

Correspondingly, the base station device receives $\{\theta_k | k=1 \sim K_d\}$ and $\{\tilde{b}_{k,s} | k=1 \sim K_d\}$ that are fed back by the UE.

In Step 22, the base station device reconstructs the downlink channel by using, for example, the formula (8) below, but is not limited thereto:

$$\hat{\tilde{h}}_s = \sum_{k=1}^{K_d} a(\theta_k) \tilde{b}_{k,s}. \tag{8}$$

Figure 3:
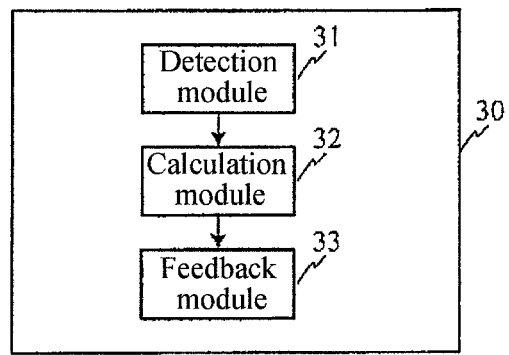
FIG. 3 shows a structural diagram of an apparatus used in a UE of a large scale antenna system according to an embodiment of the present invention.
Figure 4:
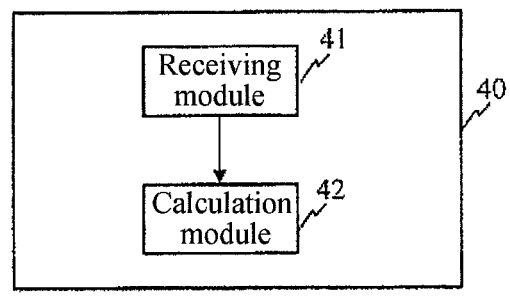
FIG. 4 shows a structural diagram of an apparatus used in a base station device of a large scale antenna system according to an embodiment of the present invention.

FIG. 3 shows a structural diagram of an apparatus 30 used in a UE of a large scale antenna system according to an embodiment of the present invention. FIG. 4 shows a structural diagram of an apparatus 40 used in a base station device of a large scale antenna system according to an embodiment of the present invention. The apparatus 30 is usually configured in a UE. As shown in FIG. 3, the apparatus 30 includes a detection module 31, a calculation module 32, and a feedback module 33. The apparatus 40 is usually configured in a base station device. As shown in FIG. 4, the apparatus 40 includes a receiving module 41 and a calculation module 42.

The detection module 31 is configured to detect a downlink channel.

The calculation module 32 is configured to determine, according to a multipath propagation model from the detected downlink channel (matrix), a channel response of a first number of strong propagation paths, where the channel response of each strong propagation path is determined as a matrix related to the following time-varying parameters: an arrival direction, time to arrive, and a path amplitude. The channel response of each strong propagation path is, for example, the expression form at the right side of the equation in formula (1), but is not limited thereto.

Two manners for determining the first number of strong propagation paths are described in the foregoing, and are not repeated herein.

The feedback module 33 is configured to feed back the first number and indication information of the time-varying parameters of the first number of strong propagation paths.

Generally, the "first number" (the number of strong propagation paths) is represented as $K_d$, and all the propagation paths are sequenced in descending order of amplitudes, that is, $|\beta_1| \geq |\beta_2| \geq \Lambda \geq |\beta_k|$. The UE feeds back the indication information of the time-varying parameters of $K_d$ strong propagation paths. The number $K_d$ of the strong propagation paths is less than the total number K of propagation paths of the multipath channel, and therefore the feedback payload can be reduced.

In an embodiment, the feedback module 33 feeds back $\{\tau_k, \theta_k, \beta_k | k=1\sim K_d\}$. The change of the path amplitude with time is faster than the change of the arrival direction and time to arrive with time, and therefore, the feedback module 33 feeds back $\{\tau_k, \theta_k | k=1\sim K_d\}$ in a first average period which is longer, and feeds back $\{\beta_k | k=1\sim K_d\}$ in a second average period which is shorter. In this way, feedback modes of different periods are applicable to the time-varying feature of the channel parameters, thereby further saving the feedback payload.

In another embodiment, the feedback module 33 feeds back $\{\theta_k | k=1\sim K_d\}$ in the first average period which is longer, and feeds back $\{\tau_k, \delta_k | k=1\sim k_d\}$ in the second average period which is shorter. In still another embodiment, the feedback module 33 feeds back $\{\theta_k | k=1\sim K_d\}$, $\{\tau_k | k=1\sim K_d\}$, and $\{\beta_k | k=1\sim K_d\}$ in three different average periods.

The receiving module 41 is configured to receive a first number and indication information of time-varying parameters of the first number of strong propagation paths, where the first number and the indication information are fed back by a UE, and the time-varying parameters include: an arrival direction, time to arrive, and a path amplitude. For example, the receiving module 41 receives $\{\theta_k | k=1\sim K_d\}$, $\{\tau_k | k=1\sim K_d\}$, and $\{\beta_k | k=1\sim K_d\}$ that are fed back by the UE, but is not limited thereto.

The calculation module 42 is configured to determine a downlink channel response according to the received indication information of the time-varying parameters of the first number of strong propagation paths. The reconstruction of the downlink channel may be represented by the foregoing formula (4), but is not limited thereto.

In some cases, several or only one sub-band is allocated to the UE. The channel response on one sub-band may be regarded as flat; only the channel coefficient allocated to the UE needs to be fed back and reported, and it is unnecessary to report channel coefficients of the entire bandwidth. The foregoing formula (1) may be re-written as the foregoing formula (5). A channel vector of the $j^{th}$ subcarrier can be represented as the foregoing formula (6). The whole bandwidth is divided into multiple sub-bands, and the channel response in each sub-band can be regarded as flat. The average channel vector of the $s^{th}$ sub-band is represented as $\tilde{h}_s$, and $\tilde{h}_s$ can be calculated by using the foregoing formula (7), where $J_S$ represents the number of subcarriers in one sub-band, $J(S)$ represents a set of subcarriers in the $s^{th}$ sub-band, and $\tilde{b}_{k,s}$, represents the joint mean value of the time to arrive and path amplitude in the sub-band. If only the $s^{th}$ sub-band is allocated to the UE, the UE only feeds back and reports $\tilde{h}_s$ to the base station device, and it is unnecessary to report the complete channel matrix H.

Similarly, a first number of strong propagation paths are determined as $K_d$ propagation paths with a maximum module of the joint mean value $\tilde{b}_{k,s}$ or a maximum norm. Generally, all the propagation paths are sequenced in descending order of modules of joint mean values of time to arrive and path amplitudes, that is, $|\tilde{b}_{1,s}| \geq |\tilde{b}_{2,s}| \geq \Lambda \geq |\tilde{b}_{k,s}|$. The UE only needs to feed back the indication information of the time-varying parameters of $K_d$ strong propagation paths. The number $K_d$ of the strong propagation paths is less than the total number K of propagation paths of the multipath channel, and therefore the feedback payload can be reduced.

In an embodiment, the feedback module 33 feeds back $\{\theta_k, \tilde{b}_{k,s} | k=1\sim K_d\}$. The change of the joint mean value of the path amplitude with time is faster than the change of the arrival direction with time, and therefore, the feedback module 33 feeds back $\{\theta_k | k=1\sim K_d\}$ in a first average period which is longer, and feeds back $\{\tilde{b}_{k,s} | k=1\sim K_d\}$ in a second average period which is shorter. In this way, feedback modes of different periods are applicable to the time-varying feature of the channel parameters, thereby further saving the feedback payload.

Correspondingly, the receiving module 41 receives $\{\theta_k | k=1\sim K_d\}$ and $\{\tilde{b}_{k,s} | k=1\sim K_d\}$ that are fed back by the UE. The reconstruction of the downlink channel by the calculation module 42 may be represented by the foregoing formula (8), but is not limited thereto.

A person skilled in the art should understand that, the function of any one of the modules above can be implemented by multiple entity modules or functional modules, and the functions of multiple modules above can also be integrated on one entity module or implemented by a functional module.

Although different embodiments of the present invention are described above, the present invention is not limited to these embodiments. The ordinal numbers such as "first" and "second" in the claims are merely provided for the purpose of distinguishing, and does not mean that corresponding components have any specific sequence or connection relationship. The technical feature only appearing in some claims or embodiments does not mean that the technical feature cannot be combined with other features in other claims or embodiments to implement a new beneficial technical solution. Modifications, alterations, transformations, replacements, and equivalences within the spirit and scope of the present invention described in the claims are obvious to a person skilled in the art.

I claim:

1. A method used in a user equipment (UE) of a large scale antenna system, comprising:
   detecting a downlink channel;
   determining, according to a multipath propagation model, a channel response of a first number of strong propagation paths, wherein the channel response of each propagation path is determined as a matrix related to the following time-varying parameters: an arrival direction, time to arrive, and a path amplitude; and
   feeding back the first number and indication information of the time-varying parameters of the first number of strong propagation paths;
   wherein indication information of the arrival direction and time to arrival is fed back based on a first average period, indication information of the path amplitude is fed back based on a second average period, and the first average period is longer than the second average period.

2. The method according to claim 1, wherein the downlink channel comprises a sub-band, and the indication information of the time-varying parameters of the first number of strong propagation paths comprises: indication information of the arrival direction, and indication information of a joint mean value of the time to arrive and the path amplitude in the sub-band.

3. The method according to claim 2, wherein the indication information of the arrival direction is fed back based on a first average period, the indication information of the joint mean value of the time to arrive and the path amplitude in the sub-band is fed back based on a second average period, and the first average period is longer than the second average period.

4. An apparatus used in a user equipment (UE) of a large scale antenna system, comprising:
   one or more processors configured to execute:
   a detection module, configured to detect a downlink channel;
   a calculation module, configured to determine, according to a multipath propagation model, a channel response of a first number of strong propagation paths, wherein the channel response of each propagation path is determined as a matrix related to the following time-varying parameters: an arrival direction, time to arrive, and a path amplitude; and
   a feedback module, configured to feed back the first number and indication information of the time-varying parameters of the first number of strong propagation paths;
   wherein the feedback module is configured to feed back indication information of the arrival direction and time to arrival based on a first average period, and feed back indication information of the path amplitude based on a second average period, wherein the first average period is longer than the second average period.

5. The apparatus according to claim 4, wherein the downlink channel comprises a sub-band, and the indication information of the time-varying parameters of the first number of strong propagation paths comprises: indication information of the arrival direction, and indication information of a joint mean value of the time to arrive and the path amplitude in the sub-band.

6. The apparatus according to claim 5, wherein the feedback module is configured to feed back the indication information of the arrival direction based on a first average period, and feed back the indication information of the joint mean value of the time to arrive and path amplitude in the sub-band based on a second average period, wherein the first average period is longer than the second average period.

7. A user equipment (UE), comprising the apparatus according to claim 4.

* * * * *